United States Patent [19]

Okabayashi et al.

[11] Patent Number: 5,180,099
[45] Date of Patent: Jan. 19, 1993

[54] PROCESS OF JOINING OF A GALVANIZED STEEL SHEET

[75] Inventors: Makoto Okabayashi, Anjo; Masami Ishii, Toyota; Juniti Mita, Anjo; Shigeo Shinagawa, Toyota, all of Japan

[73] Assignee: Aisin Seiki Kabushiki Kaisha, Kariya, Japan

[21] Appl. No.: 731,878

[22] Filed: Jul. 18, 1991

[30] Foreign Application Priority Data

Jul. 19, 1990 [JP] Japan .................. 2-190999

[51] Int. Cl.⁵ .................. B23K 1/19; B23K 1/20
[52] U.S. Cl. .................. 228/263.14; 228/203
[58] Field of Search .................. 228/263.14, 263.15, 228/263.16, 203; 219/137 R, 137 WM; 428/659; 148/253; 427/433

[56] References Cited

U.S. PATENT DOCUMENTS

| | | | |
|---|---|---|---|
| 3,963,162 | 6/1976 | Taguchi et al. | 228/263.15 |
| 4,518,445 | 5/1985 | Pedersen et al. | 228/263.18 |
| 4,631,237 | 12/1986 | Dommer et al. | 219/69.12 |
| 4,904,842 | 2/1990 | Yasuda et al. | 219/137 R |
| 4,929,423 | 5/1990 | Tucker et al. | 228/263.11 |

FOREIGN PATENT DOCUMENTS 2311400 12/1974 Fed. Rep. of Germany.

OTHER PUBLICATIONS

Dr. Adolf Krell, Dr. Ing. Bernd-Peter Salzberg, "Hochfeste Lotverbindungen an Baustahl mit Kupfer-Nickel-Loten", SchweiBechnik Berlin 38 (1988) 4, pp. 160–163.
Adam Frings and Siegfried Stockel, "Vollmechanisches Metall-Inertgashartoleten von feuerverzinktem Feinblech aus Stahl", SchweiBen and Schneiden 38 (1986) vol. 12, pp. 624–629.
J. Ruge, Handbuch der SchweiBtechnik, vol. II Verfahren and Fertigung, 2nd edition 1980, pp. 105–107, 112, 113, 359, 360.
Welding Technique, vol. 37-2, pp. 94–98, (ISSN 0387-0197).

Primary Examiner—Samuel M. Heinrich
Attorney, Agent, or Firm—Finnegan, Henderson, Farabow, Garrett and Dunner

[57] ABSTRACT

A process of joining galvanized steel sheets using a solder comprising copper and 10~30% by weight nickel with a welding machine. The process of joining the galvanized steel sheets includes a first step of phosphatizing before the joining.

2 Claims, 2 Drawing Sheets

PROCESS OF JOINING OF A GALVANIZED STEEL SHEET

BACKGROUND OF THE INVENTION

1. Field of the Invention

The present invention relates to a process of joining galvanized steel sheets, and in particular to a process of joining door frames of an automobile.

2. Description of the Related Art

A galvanized steel sheet to be used in automoibles is treated with an anti-rusting process. A galvanized steel sheet formed by rollers is often used for a automobile door frame. A process of join a plurality of piled sheets by welding is disclosed at WELDING TECHNIQUE, VOL37-2, page 94~98, 1989 (ISSN 0387-0197).

In general, in order to prevent blowholes (a defect described later) from forming in the galvanized steel sheet at the point it is joined to another sheet, the following methods are sometimes used:

(1) One method involves stripping away the zinc galvanized on the part to be joined prior to joining.

(2) A second method involves coating onto the part anti-blowhole agent.

(3) A third method involves using a Cu wire (Cu-Si etc.) for a solder to join the parts.

(4) A fourth method involves using a galvanized steel wire of the Fe family as the solder material.

However, the above-mentioned methods present problems as follows;

(1) In stripping the galvanized steel sheet, the number and complexity of the stripping processes increase, and the anti-rust effect decreases. There is both a mechanical method and a chemical agent treatment method for stripping of the galvanized steel sheet. Regarding the mechanical method, it is necessary to shave about 5/100 mm from the sheet, otherwise it is impossible to wholly strip the galvanized zinc. For the chamical agent treatment method, the chemical agent penetrates the clearance between door frames, in the case of overlapped frames, so that the power of the anti-rust treatment decrease.

(2) For the second method i.e. coating with an anti-blowhole agent, it is necessary to coat the anti-blowhole agent many times, and if necessary, to have previously coated the anti-blowhole agent between the plates of the frames. However, it is impossible to remove the anti-blowhole agent from between the plates of the frames after they are joined.

(3) For the third method, using Cu wire as the solder, there is a reduced number of blowholes produced. However, after the joining there is performed a method of electrodeposit coating as treatment of the door frame. The electric resistance of the joint is smaller than that of the galvanized steel sheet because of the Cu solder, so that a thicker layer of the coating adheres to the joint, and the appearance is faulty. Additionally, in general before electrodeposit coating, a phosphatizing of the frame is performed. This phosphatizing treatment is possible on Fe or Zn, but not on Cu.

The electric resistance of the phosphatizing coating is very high, so that the differance of the coating thickness increases more and more.

(4) For the fourth method, using a wire of galvanized steel sheet of Fe family, the blowholes decrease 166~1/10, but are not eliminated.

SUMMARY OF THE INVENTION

Therefore, it is an object of the present invention to provided a process of joining two galvanized steel sheets using a solder comprising copper and 10~30% by weight of nickel with a welding machine to join the sheets.

There is further provided a process of joining galvanized steel sheets with solder comprising; treating said sheets by phosphatizing, and joining said sheets with a welding machine using a solder comprising copper and 10~30% weight of nickel.

DESCRIPTION OF THE PREFERRED EMBODIMENT

Figure 1:
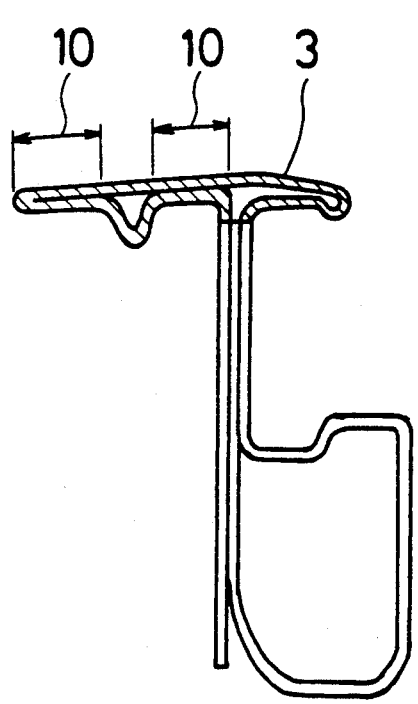
FIG. 1 is a schematic sectional view of the joining of parts of an automobile door frame taken along line A—A of FIG. 2(a).

FIG. 1 is a schematic sectional view of a joined part an automobile door frame. The oblique lines show the parts joined to form the frame along line A—A of FIG. 2(a).

Figure 2:
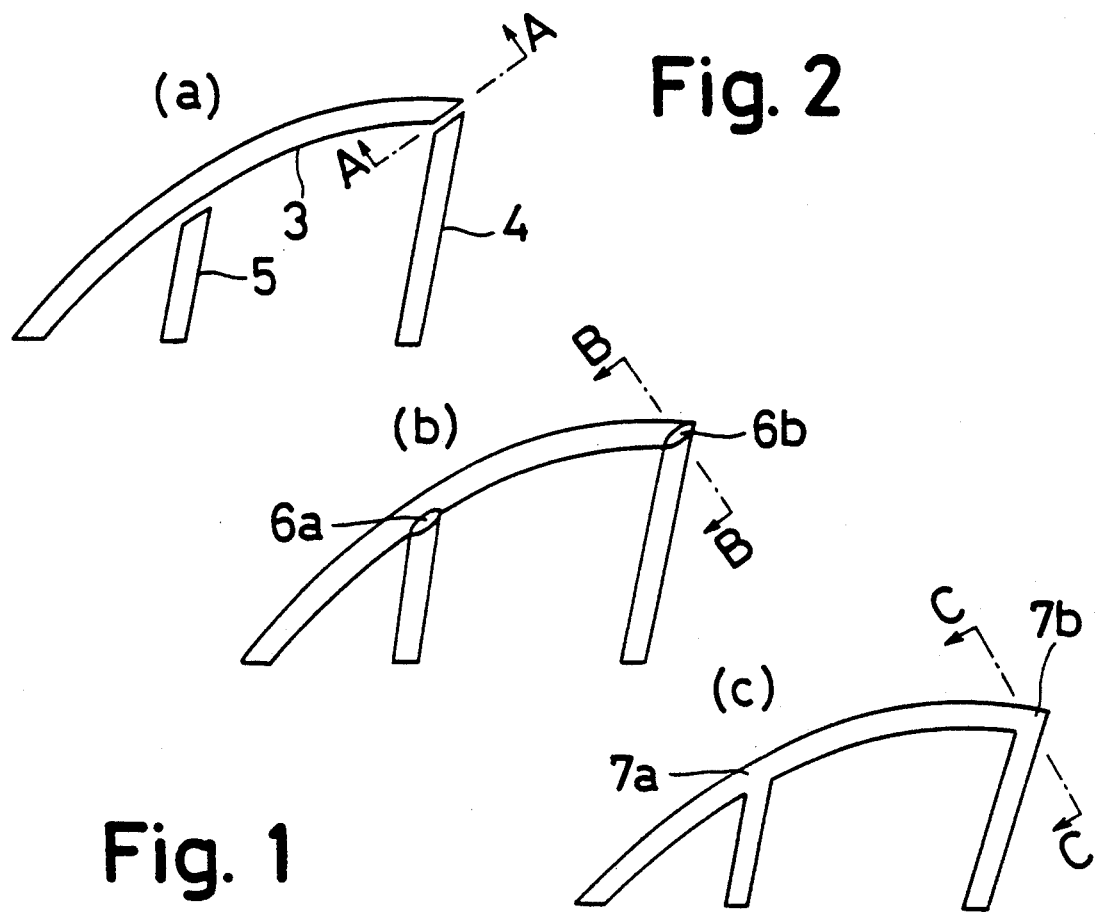
FIG. 2(a) is a schematic illustration showing unjoined parts of a the door frame.
FIG. 2(b) is a schematic illustration showing a process of joining the parts.
FIG. 2(c) is a schematic illustration showing the joined parts after polishing.

After roll forming a steel sheet, the door frame is manufactured first by joining the parts of the sheet and then polishing. FIGS. 2(a) through 2(c) show schematic illustrations of the steps of manufacturing.

Numeral 3 refers to a main door frame, numeral 4 refers to a vertical frame, and numeral 5 refers to a lower door frame. FIG. 2(a) illustrates the construction of the door frame. FIG. 2(b) shows the processes of joining the parts at joint 6a, 6b. FIG. 2(c) shows the polished parts 7a, 7b which show the polished joints 6a, 6b.

Figure 3:
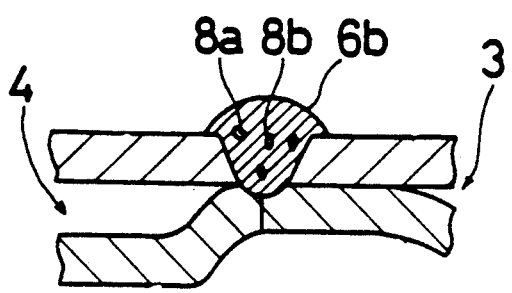
FIG. 3 is a schematic sectional view taken along line B—B of FIG. 2(b) illustrating the generated blowholes.

FIG. 3 shows a schematic sectional view of joint 6b in the line B—B of FIG. 2(b), and shows that there are blowholes 8a, 8b along joint.

Figure 4:
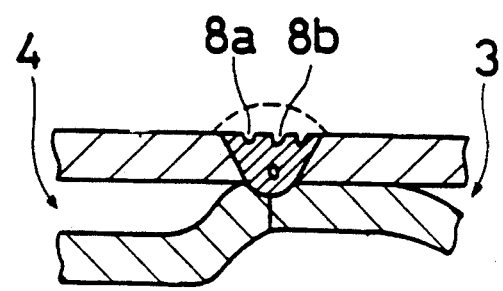
FIG. 4 is a schematic sectional view of a polished joint taken along line C—C of FIG. 2(c).

FIG. 4 shows a schematic sectional view of the polished parts 7a, 7b along line C—C of FIG. 2(c), and shows that, after polishing, the blowholes 8a, 8b are evident at the surface, so that the quality of appearance is very poor.

In the automobile body of FIG. 1, when part 10 of the steel sheets, which overlap, are joined, zinc vapor which does not escape from between the steel sheets penetrates the joint, because the boiling point of zinc is lower than the melting point of Fe, so that the blowholes 8a, 8b are generated as shown in FIG. 3.

When the joints 6a, 6b are polished, the blowholes are evident at the surface, and the appearance of the door frame is degraded significantly.

Figure 5:
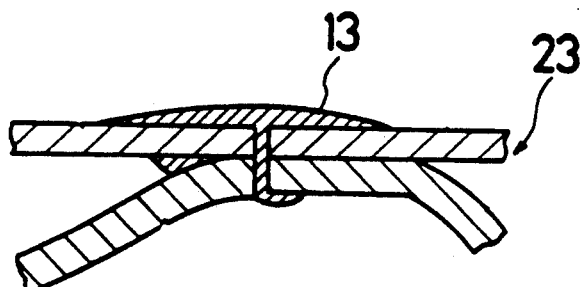
FIG. 5 is a schematic sectional view of the joint part along line B—B of FIG. 2 according to this invention.

In one embodiment of the present invention of the joining of one door frame part 23 and another door frame part 24 of FIG. 5 is performed using a solder 13 comprising copper and 10~30% by weight of nickel.

Using the solder 13, the zinc vapor from the galvanization coating is absorbed into the Cu, so that a Cu-zinc Alloy is formed. As a result, no blowholes are generated in the joint.

Moreover, after polishing the door frame, phosphatizing the door frame, and coating the door frame by an electrodeposited coating the electrical resistance of the joint is increased, because of the addition of nickel in the solder so that the adhesion of subsequent coating material at the joint deceases; and the thickness at joint is the same as the thickness of other portions of the steel sheet.

As a result of this, the surface of the joint and the galvanized steel sheet is plain with is no defects.

Figure 6:
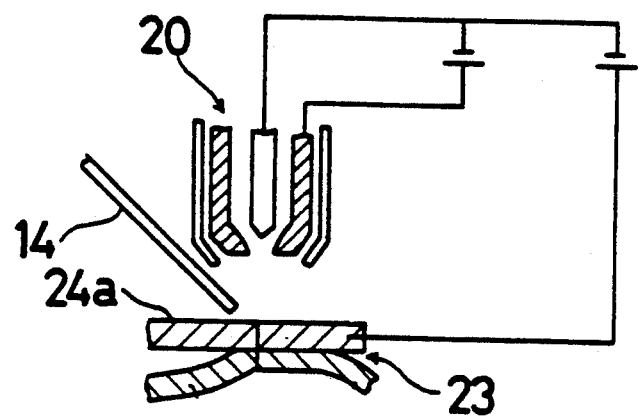
FIG. 6 is a schematic sectional view of the nozzle of a welding machine used in this invention.

Table 1 illustrates the results estimated by using the above-described solder and the welding machine shown in FIG. 6. Table 1 also estimates the strength of the joint and the thickness of the joint coated by the electorodeposited coating. Referring to FIG. 6, numeral 20 refers to a welding machine, and numeral 14 shows a solder bar.

Table 1 additionally shows that the solder of copper with 10~30% by weight nickel is the most preferable solder wire to use in order to have no blowholes, a high sterength joint, and a plain surface on the galvanized steel sheet.

TABLE 1

| Solder Wt % | Blowhole | Strength | Thickness of coating onto the joint Thickness of coating onto the steel sheet 20 μm | Evaluation collectively |
|---|---|---|---|---|
| Cu-3Si | NO | Fracture of the steel sheet | 3.0 μm | Δ |
| Cu-10Ni | NO | " | 2.0 μm | ○ |
| Cu-30Ni | NO | " | 2.0 μm | ○ |
| Cu-50Ni | NO | " | 1.0 μm | Δ |
| Cu-10Zn | NO | Fracture of the joint part | 3.0 μm | X |
| Cu-30Zn | NO | " | 2.0 μm | X |

What is claimed is:

1. A method of joining two galvanized steel sheets, comprising:
    using a solder including copper and approximately ten to thirty percent of nickel by weight; and
    joining the solder to the two sheets with a welding machine.

2. A method of joining galvanized steel sheets with solder, comprising:
    phosphatizing the sheets to be joined;
    applying a solder adjacent a joint of the sheets, said solder including copper and approximately ten to thirty percent by weight of nickel; and
    joining the sheets and the solder at the joint with a welding machine.

* * * * *